United States Patent [19]
Venables, III

[11] 3,820,217
[45] June 28, 1974

[54] HEAT EXCHANGER TUBE AND APPARATUS FOR MAKING SAME

[75] Inventor: Herbert J. Venables, III, Hunting Valley, Ohio

[73] Assignee: The Venables Machine and Tool Company, Cleveland, Ohio

[22] Filed: Oct. 16, 1972

[21] Appl. No.: 297,717

Related U.S. Application Data

[63] Continuation-in-part of Ser. No. 135,183, April 19, 1971, Pat. No. 3,722,059.

[52] U.S. Cl.............................................. 29/202 D
[51] Int. Cl........................................... B23p 15/26
[58] Field of Search....... 113/1 C, 118 A; 29/202 D, 29/157.3 B, 202 R, 157.3 AH

[56] References Cited
UNITED STATES PATENTS

| 2,251,642 | 8/1941 | Tilley | 113/118 A |
| 2,553,142 | 5/1951 | McCreary | 113/118 A |
| 2,583,682 | 1/1952 | Celovsky | 113/1 C |
| 3,005,253 | 10/1961 | Venables | 29/157.3 AH |
| 3,134,166 | 5/1964 | Venables | 29/157.3 AH |
| 3,160,129 | 12/1964 | Venables | 29/157.3 AH |
| 3,550,235 | 12/1970 | Jarvis et al. | 29/157.3 AH |
| 3,688,375 | 9/1972 | Venables | 29/157.3 AH |
| 3,722,059 | 3/1973 | Venables | 29/202 |

Primary Examiner—Charles W. Lanham
Assistant Examiner—M. J. Keenan
Attorney, Agent, or Firm—McNenny, Farrington, Pearne Gordon

[57] ABSTRACT

An improved spine finned heat exchanger tube and an apparatus for forming such tube is disclosed. The spine is formed by slitting a strip of metal from at least one edge toward the center by the use of cooperating cutter rolls which are connected by gearing to maintain a predetermined small clearance between the cutter teeth. Because the cutters are connected, the quality of the cut is improved, distortion of the spine is reduced, and the cutting operation is not materially effected by variations of the quality of the stripped material. Further, cutter wear is reduced since the cutting teeth do not engage even when the cutters are run without stock. Less tearing and crystalization occurs at the junction between the spine and the base material providing greater heat transfer capacity.

10 Claims, 7 Drawing Figures

PATENTED JUN 28 1974 3,820,217

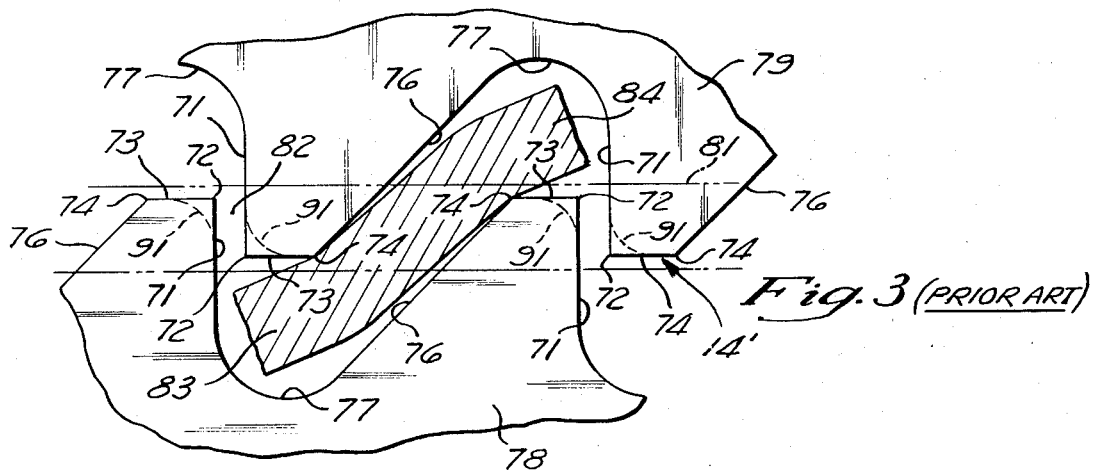
Fig. 3 (PRIOR ART)
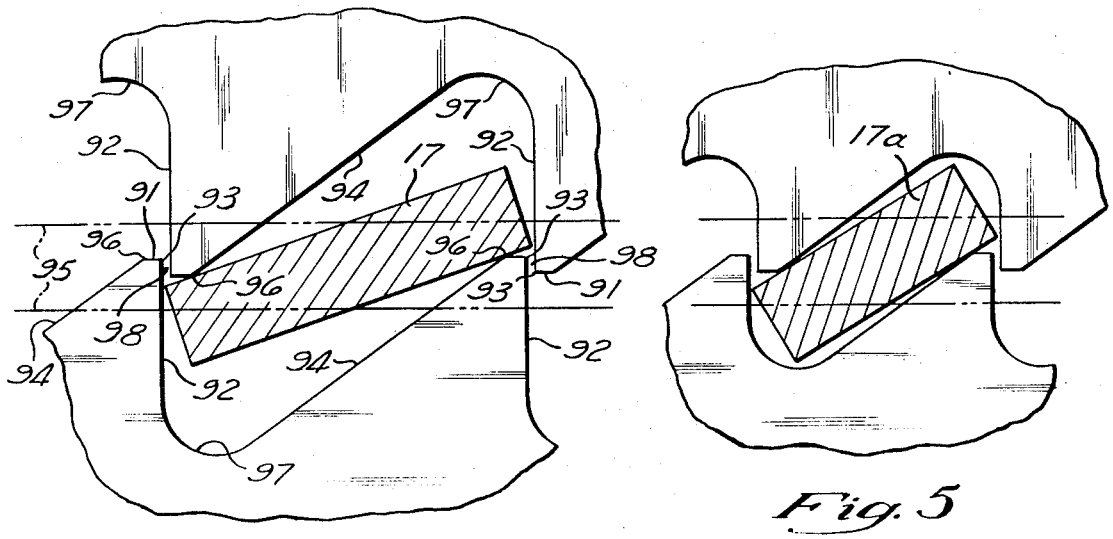
Fig. 4
Fig. 5
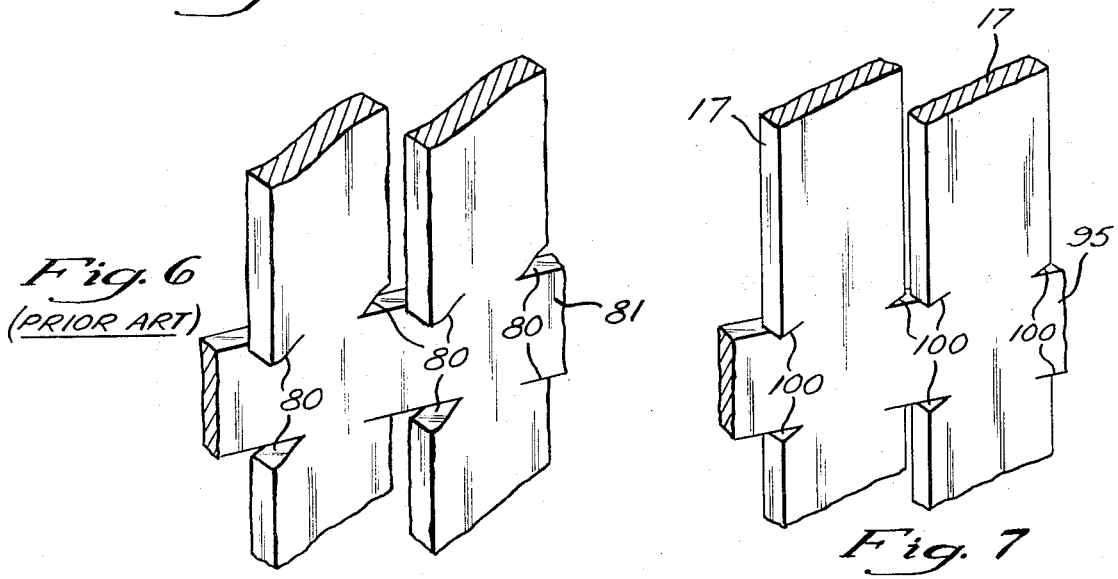
Fig. 6 (PRIOR ART)
Fig. 7

HEAT EXCHANGER TUBE AND APPARATUS FOR MAKING SAME

This application is a continuation-in-part of my co-pending application, Ser. No. 135,183, now U.S. Pat. No. 3,722,059 filed Apr. 19, 1971.

BACKGROUND OF THE INVENTION

This invention relates generally to the manufacture of spine finned heat exchanger tubing and more particularly to a novel and improved spine fin tube heat exchange and to a novel and improved machine for forming such tubing.

PRIOR ART

In my prior patents, U.S. Pat. Nos. 3,005,253 dated Oct. 24, 1961; 3,134,166 dated May 26, 1964; and 3,688,375 dated Sept. 5, 1972, I disclose a heat exchanger tube structure in which a spine fin is helically wound around a base tube to provide a light-weight highly efficient heat exchanger structure and machines for forming such tubing.

The spines of such heat exchanger tubes are formed by slitting an elongated strip of metal such as aluminum from one or both sides to form separate tongue-like spines attached to the strip at their inner ends. After the strips are cut, they are formed so that the spines extend substantially at right angles from the strip base, and the strip is wound around the tube in a helical manner. In such prior patents and the pending application referred to, the spines are cut in the strip by cooperating ratchet-type cutter rolls having intermeshing saw-toothed shaped cutting teeth. In such machines, one of the rolls are powered and driven by the main machine drive, and the cooperating roll is an idler roll driven by the powered roll.

Such cutters employing one drive roll and one driven roll encounter rapid wear when they are run without cutting stock since the cutting edges of the intermeshing teeth engage the associated teeth on the other roll under such conditions. Consequently, it has been necessary in the past to form the teeth with a relatively broad end face and to position the cutter rolls so that they overlap or intermesh a substantial amount. With such broad end faces and substantial overlap, the cutters have been usable even after substantial amount of wear has occurred.

Cutters employing a driven roll do not encounter appreciable wear when cutting a strip because such strip maintains a spacing between the corresponding teeth on the two rolls. However, such spacing varies with the physical properties of the strip being cut with the result that the slitting of the strip is not completely uniform. In some extreme instances when the strip is very soft, the strip is not cut but merely corrugated. Further, it has been commercially impractical to use such cutters to slit spines having a very small width in the strip direction.

In practice, the minimum spine width that has been practical to commercially cut with such cutters has been about 0.030 inches. Such spines have exhibited in many instances a substantial amount of edge distortion which tends to inhibit flow of air over the spines in heat exchanger installations and tends to reduce the heat exchange capacity of the spine finned tube. Further, in such spines, a substantial amount of working and tearing occurs at the root end of the spine and this inhibits the heat transfer between the tube and the spines.

SUMMARY OF THE INVENTION

In a method and apparatus in accordance with the present invention, two cutter rolls cooperate to slit and form spines along one or both edges of the strip. In the illustrated embodiment, the two cutters are positively mechanically interconnected by gearing to maintain an exact controlled rotational orientation between the cutter rolls. The cutters are formed with saw-toothed type cutting teeth which overlap with associated teeth on the other rolls. The gearing insures that the cutting edges do not engage even when the cutter rolls are operated without a strip to be cut.

This eliminates the rapid wear which tends to occur when the cutting edges of the teeth engage the associated roll. The gearing is arranged to maintain a predetermined small space between associated cutting edges when the strip material is being slit. Therefore, a more uniform slitting operation is obtained in which the slitting is not materially affected by the physical properties of the strip being cut.

The cutting teeth are formed with narrow end faces and are adjusted so that the overlap of the associated teeth is minimal. Consequently, narrower spines can be cleanly cut with little or not edge distortion. Further, the distortion occurring at the root of each spine is minimized so as to allow good heat transfer between the tube and each spine.

BRIEF DESCRIPTION OF THE DRAWINGS

FIG. 3 is a greatly enlarged fragmentary section illustrating the cutter teeth structure in accordance with the prior art and the manner in which the spines are cut by such cutters;

FIG. 4 is an enlarged fragmentary view of the cutter teeth in accordance with the present invention again illustrating a spine being cut by the cutters having the same lateral width as the spine illustrated in FIG. 3;

FIG. 5 is an enlarged view illustrating the cutter tooth shape and a spine cut thereby in which the lateral width of the spine is reduced below the width of FIGS. 3 and 4;

FIG. 6 is a fragmentary perspective of greatly enlarged scale illustrating the spines of the prior art in which considerable edge and root distortion occurs; and FIG. 7 is a fragmentary perspective view of spines formed in accordance with the present invention.

DETAILED DESCRIPTION OF THE DRAWINGS

Figure 1:
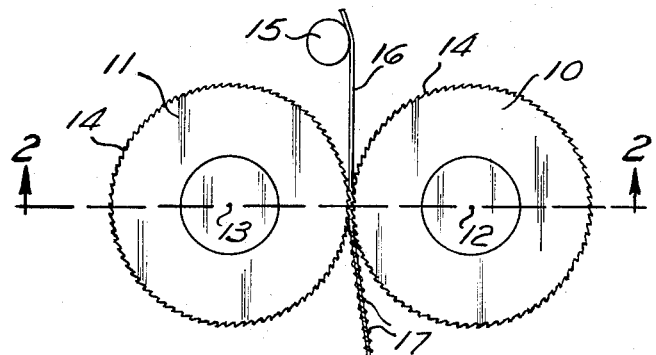
FIG. 1 is a plan view of a pair of cutter rolls in accordance with the present invention illustrated with a strip of material being fed therebetween.
Figure 2:
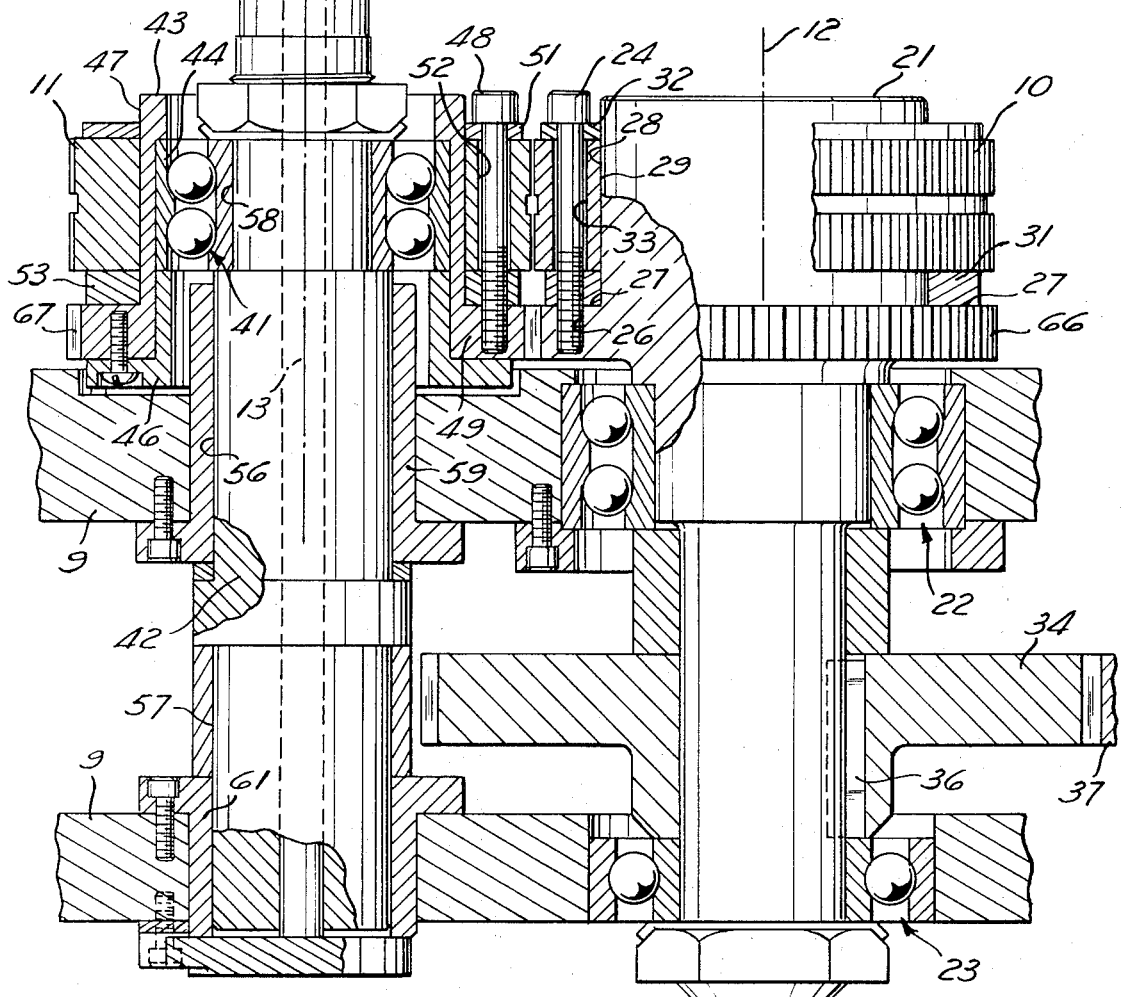
FIG. 2 is a cross section taken generally along 2—2 of FIG. 1 illustrating the roll mounting and gear connection between the rolls.

FIGS. 1 and 2 illustrate a pair of cutter rolls incorporating the present invention. It should be understood that the illustrated rolls are incorporated into a machine which may include other structures in accordance with my prior patents and application referred to above and that after the cutting or slitting operation on the strip, the strip is progressively formed and finally wound in a helical manner on a tube. Therefore, such prior patents and application are incorporated herein by reference.

The two cutter rolls 10 and 11 are journaled for counter rotation about respective axes 12 and 13. Each of the rolls is formed along its periphery with saw-toothed shaped cutter teeth 14. The spacing of the axes and the size of the rolls are proportioned so that the cutter teeth overlap and each tooth cooperates with an associated tooth on the other roll to cut or slit a strip 16 as it passes between the rolls. The uniformity of the slitting operation is improved when the strip is fed into the rolls in a direction perpendicular to and bisecting the line connecting the two axes 12 and 13. Therefore, a guide 15 is provided to position the strip. The rolls may be arranged to slit the strip from one or both edges to form spines 17 which extend perpendicular to the length of the strip from the edge thereof. Each spine remains joined to the uncut portion of the strip. The particular shape of the teeth 14 and their interrelationship is discussed in greater detail below. In the cutters illustrated, however, a strip 16 is cut or slit from both edges toward the center leaving an uncut center section to which each of the spines 17 is joined at its inner end.

Referring to FIG. 2, the cutter roll 10 is mounted on a spindle 21 which is journaled in spaced bearings 22 and 23 for rotation about the axis 12. The mounting of the roll 10 on the spindle 21 is accomplished by bolt fasteners 24 which are threaded into tapped holes 26 formed in an integral flange 27 on the spindle 21. The radial positioning of the roller on the spindle is determined by a very close fit between a cylindrical surface 28 on the spindle and the inner surface 29 on the cutter. Axial positioning of the cutter is determined by a spacer 31 positioned between the lower end of the cutter and the flange 27.

The bolts extend through a washer 32 positioned above the cutter roll 10, a clearance opening 33 formed in the cutter roll associated with each bolt, the spacer 31 and into the flange 27. A limited amount of rotational adjustment is provided by the clearance openings 33 so that the roll can be positioned in the exact desired rotational orientation with respect to the other roll. The spindle 21 is powered and rotated through a gear 34 which is keyed to the spindle by a key 36 and meshes with a drive gear 37 forming a part of the main power drive gear system of the machine.

The cutter roll 11 is journaled on a bearing 41 which is in turn supported by a nonrotating spindle 42 so that the cutter 11 is rotatable about the axis 13.

The particular structure illustrated for mounting the roller 11 includes a tube element 43 which closely fits the outer race 44 of the bearing 41 and is clamped to the bearing by a clamp element 46. The cylindrical surface 47 on the tube 43 closely fits the inner diameter of the roll 11 to radially locate the roll with respect to the tube 43. A similar mounting structure is utilized to secure the roll 11 to the tube 43 in which bolt fasteners 48 are threaded into an integral flange 49 formed on the tube 43. Here again, the bolt fasteners extend through a washer 51, a clearances hole 52 formed in the roll 11 and a spacer 53 which determines the axial position of the roll. The rotational orientation of the roll 11 with respect to the tube 43 is adjustable to a limited extent because the bolts 48 extend through clearance holes 52 in the roll.

In the illustrated embodiment, adjustment of the spacing between the axis 12 and the axis 13 is provided. The spindle 42 is formed with two cylindrical surfaces 56 and 57 which are concentric with each other but eccentric from the axis 13 and the cylindrical surface 58 within the bearing 41. The eccentric cylindrical surfaces closely fit bushings 59 and 61 mounted in the machine frame 9. A draw bolt 62 is operable to clamp the spindle in an adjusted position when it is tightened by means of a nut 63. When it is desired to adjust the spindle position 43 to move the axis 13 closer to or further away from the axis 12, the nut 63 is loosened and the spindle is rotated until the desired spacing is obtained. Because of the eccentricity of the surfaces 56 and 57 with respect to the surfaces 58, such rotation of the spindle 42 provides lateral adjustment of the axis 13 and in turn of the roll 11 with respect to the roll 10.

The spindle 21 is provided with accurately formed gear teeth 66 on the periphery of the flange 27 which mesh with accurately formed gear teeth 67 formed on the tube 43 to provide a positive mechanical interconnection between the spindle 21 and the tube 43 to insure that the desired rotational orientation of the two cutter rolls 10 and 11 is maintained. The gears are adjusted to a no-backlash condition to insure that the rotational orientation of the two cutter rolls is accurately maintained.

FIG. 3 illustrates the prior art cutters and the manner in which the cutting occurs when only one cutter roll is driven and the other roll is an idler type roll driven by the first. The tooth shape is illustrated at a greatly enlarged scale as is the material being cut. In all of FIGS. 3, 4, and 5, the scale is about 100 to 1. The teeth 14' on each of the rolls are formed with a radial face 71 extending to a cutting edges 72 at the junction of the radial face and an end face 73. The edge of the end face 73 opposite the cutting edge 72 joins at a corner 74 with an inclined surface 76. A radiused surface 77 joins the inclined surface of one tooth with the radial surface 71 of the adjacent tooth.

Generally, the teeth have been formed with an end facing having a width of between 0.004 inches and 0.007 inches. When the spacing of the teeth is arranged to cut spines having a length in the order of 0.030 inches from stock having a thickness in the order of 0.007 inches, the inclined surface is oriented with respect to a radius at an angle of about 45°. Assuming that the roll cutter 78 is the drive roller and rotates in a clockwise direction and the roller 79 is a driven idler roller and rotates in an anticlockwise direction, the ribbon of stock 81 indicated by the dotted line moves to the right as viewed in FIG. 3.

The presence of the stock being cut maintains a gap 82 between adjacent teeth. The size of this gap is uncontrolled and depends upon many factors such as the sharpness of the teeth, the thickness of the strip, and the hardness or ductility of the strip and the like. However, since the gap can be relatively large, a good, clean cut is not always accomplished, and there is a tendency for the edges of the spine to be distorted as illustrated at 83 and 84 by the engagement of the corners 74 with the stock at a point spaced from the sheared edge. Further, there is a tendency for the sheared edges to be somewhat ragged as indicated. Because of the relatively deep overlap in the order of 0.005 inches to 0.006 inches, which is substantially equal to the thickness of the strip, the spines are twisted to a considerable extent from alignment with the main uncut portion of the strip 81. In fact, the edges of the spines are displaced beyond the side of the base strip 81. This results in rather severe tearing and working of the material of the spine at 80 where the inner end of the spine joins the main portion of the strip as best illustrated in FIG. 6. Such distortion and tearing cause crystalization of the materials and reduces the section through which heat can flow between the spine and the base of the strip and in turn from the base of the strip to the tube.

When the cutter rolls are operated without stock, the cutting edges 72 engage the radial faces 71 of the associated teeth and cutter wear occurs relatively rapidly. Such wear tends to cause the corners at the cutting edges 72 to wear away to a condition illustrated by the dotted lines 91. In the past, it has been necessary to form the teeth with relatively broad end faces 73 so that a reasonable amount of wear could occur before the cutters had to be discarded. However, as the wear occurred, quality of the cut formed by the cutters deteriorated and the product produced was not as good as the product produced by sharp new cutters. The wear that occurred due to the actual cutting operation is not nearly as severe as the wear that occurs when the teeth of the rolls engage.

FIG. 4 illustrates the preferred cutter to form in accordance with the present invention. The cutter teeth are illustrated in FIG. 4 at the same scale as in FIG. 3. However, the rolls 10 and 11 are interconnected by the gearing so that the cutter teeth do not actually engage even when the rolls are run without stock. Preferably, the teeth 14 are formed with end faces 91 having a width in the order of 0.0015 inches which joined with the radial face 92 at a cutting edge 93. The inclined surface 94 in this particular tooth extends at an angle of about 55° with respect to the radius from a corner at 96. Here again, a radius 97 joins the inclined surface 94 of one tooth with the radial surfaces 92 of the adjacent tooth.

Preferably, the rotation orientation of the two rolls is adjusted so that a gap 98 in the order of 0.0010 inches or less exists between adjacent radial surfaces 92 of associated teeth. This gap is maintained by the gearing interconnecting the rolls at such a size both when the rolls are rotating without stock and when the rolls are cutting stock. The depth of the intermeshing of the gear teeth is preferably adjusted to about 0.0015 inches which is equal to substantially less than one-half the strip thickness of 0.007 inches. In fact, in the illustrated embodiment, the overlap is about 20% of the strip thickness.

Because the gap 98 is controlled at a small but constant value this small amount of overlap is sufficient to insure good cutting. Because a better cutting action occurs with the small gap 98 and because the end faces 91 are narrow, the fin 17 is not distorted to any appreciable extent, and the end surfaces are far cleaner than in the prior art. Also, the amount of distortion or twisting of the fins with respect to the base strip 16 is less, and the necessary clearance between the teeth to accommodate the fin is provided even though the angle of the inclined surface 94 is less than in the prior art. Further, the twisting is less and the displacement of the edges from the length of the strip, illustrated by the dotted line 95, is less. Therefore, the amount of distortion or tearing at 100 occurring at the root of the fin is drastically reduced as illustrated in FIG. 7. Consequently, a better heat exchange condition exists between the root of the fin 17 and the uncut portion of the strip 16 because tearing and crystalization is reduced.

FIG. 5 illustrates an embodiment of this invention in which a fin 17a is cut from stock having a thickness of 0.007 inches which is the same thickness illustrated in FIGS. 3 and 4, but the fin has a width of 0.023 inches instead of 0.030 inches. Because the twisting of the fin is less with cutters in accordance with this invention and because greater control is achieved of the slitting or cutting itself, it has been found that it is practical to form narrower fins of the type illustrated in FIG. 5 whereas in the prior art, the narrowest fin which could be commercially produced in a satisfactory manner appeared to be about 0.030 inches with such stock. It is believed that even narrower fins can be produced in accordance with the present invention when the cutters are interconnected and maintained at a predetermined rotational orientation. The teeth illustrated in FIG. 5 are provided with the same degree of overlap and the same angles as the teeth illustrated in FIG. 4. However, the peripheral width of the teeth, of course, is reduced to produce a narrower fin.

Although a preferred embodiment of this invention is illustrated, it is to be understood that various modifications and rearrangements of parts may be resorted to without departing from the scope of the invention disclosed and claimed herein.

What is claimed is:

1. A machine for forming spine finned heat exchanger tubing or the like comprising a pair of toothed cutters journaled for counter rotation about parallel axes, a gear connected to each cutter for coaxial rotation therewith, said gears meshing with each other and providing a positive mechanical connection causing said cutters to counter rotate with a predetermined rotational orientation, said cutters being formed with cutting teeth each provided with a cutting edge which cooperates with a cutting edge of an associated tooth on the other cutter to cut spines in a strip of material passing therebetween, said gearing maintaining a constant small spacing between associated cutting edges as said cutters rotate, associated teeth being shaped with sufficient clearnace therebetween to receive a substantially undistorted spine, and means for forming a strip cut by said cutters and winding the formed strip around a tube.

2. A machine for forming spine finned heat exchanger tubing as set forth in claim 1 wherein said teeth overlap a distance substantially less than one-half the thickness of said strip.

3. A machine for forming spine finned heat exchanger tubing as set forth in claim 2 wherein said teeth are formed with end faces having a width at least substantially as small as said overlap distance.

4. A machine for forming spine finned heat exchanger tubing as set forth in claim 1 wherein said teeth overlap a distance substantially equal to 20 percent of the thickness of said strip.

5. A machine for forming spine finned heat exchanger tubing as set forth in claim 1 wherein means are provided to adjust the spacing of said axes with respect to each other.

6. A machine for forming spine finned heat exchanger tubing as set forth in claim 1 wherein means are provided to adjust the rotational orientation of said cutters with respect to each other.

7. A machine for forming spine finned heat exchanger tubing as set forth in claim 1 wherein a rotating spindle is provided to support each cutter and said gears are carried by said spindles, and means are provided to adjust said gears for substantially no backlash.

8. A machine for forming spine finned heat exchanger tubing as set forth in claim 7 wherein releasable clamp means releasably secure each cutter to its associated spindle and allow limited rotational adjustment of each cutter with respect to its associated spindle.

9. A machine for forming spine finned heat exchanger tubing as set forth in claim 8 wherein guide means operate to guide said strip into said cutters perpendicular to a line connecting said axes.

10. A machine for forming spine finned heat exchanger tubing or the like comprising a pair of toothed cutters journaled for counter rotation about parallel axes, meshing gears connecting said cutters and providing a positive mechanical connection causing said cutters to counter rotate with a predetermined rotational orientation, said cutters being formed with cutting teeth each provided with a cutting edge which cooperates with a cutting edge of an associated tooth on the other cutter to cut spines in a strip of material passing therebetween, said gearing maintaining a constant small spacing between associated cutting edges as said cutters rotate, associated teeth being shaped with sufficient clearance therebetween to receive a substantially undistorted spine.

* * * * *